(12) United States Patent
Feng et al.

(10) Patent No.: US 7,599,596 B1
(45) Date of Patent: Oct. 6, 2009

(54) OPTICAL RECEIVER FOR USE WITH RANGE OF SIGNAL STRENGTHS

(75) Inventors: Dazeng Feng, Arcadia, CA (US); Mehdi Asghari, San Marino, CA (US); Daniel C. Lee, Rosemead, CA (US)

(73) Assignee: Kotura, Inc., Monterey Park, CA (US)

( * ) Notice: Subject to any disclaimer, the term of this patent is extended or adjusted under 35 U.S.C. 154(b) by 107 days.

(21) Appl. No.: 12/077,068

(22) Filed: Mar. 13, 2008

(51) Int. Cl.
*G02B 6/10* (2006.01)
*H04B 10/00* (2006.01)

(52) U.S. Cl. ............... 385/132; 385/130; 385/131; 385/14; 385/43; 385/140; 385/49; 398/138; 398/139

(58) Field of Classification Search .............. 385/14, 385/31, 49, 43, 88, 89, 92, 93, 94, 129, 130, 385/131, 132, 140, 12; 398/135, 138, 139
See application file for complete search history.

(56) References Cited

U.S. PATENT DOCUMENTS

| | | | |
|---|---|---|---|
| 5,757,986 A | 5/1998 | Crampton et al. | 385/2 |
| 5,908,305 A | 6/1999 | Crampton et al. | 438/31 |
| 6,801,702 B2 | 10/2004 | Day | 385/130 |
| 7,113,683 B2 * | 9/2006 | Hayamizu et al. | 385/129 |
| 7,303,339 B2 * | 12/2007 | Zhou et al. | 385/91 |
| 2004/0042729 A1 * | 3/2004 | Zhou et al. | 385/49 |

* cited by examiner

Primary Examiner—Brian M Healy
(74) Attorney, Agent, or Firm—Gavrilovich, Dodd & Lindsey, LLP

(57) ABSTRACT

A receiver includes a waveguide defined in a layer of silicon positioned on a base. The waveguide is immobilized relative to the base along the length of the waveguide. The waveguide is unbranched and is a multi-mode waveguide. The receiver also includes a groove configured to receive an optical fiber. The groove is positioned such that when the optical fiber is positioned in the groove the waveguide receives a light signal that exits a facet of the optical fiber. The receiver also includes a light sensor configured to receive the light signal from the waveguide after the light signal is received by the waveguide, is guided through the waveguide, and exits the waveguide. The receiver also includes a tunable optical attenuator configured to attenuate the light signal as the light signal travels along the waveguide. The receiver can be formed on a chip such that the waveguide is the only optical waveguide on the chip.

41 Claims, 2 Drawing Sheets

OPTICAL RECEIVER FOR USE WITH RANGE OF SIGNAL STRENGTHS

FIELD

The present invention relates to optical devices and particularly, to optical receivers.

BACKGROUND

Optical systems are increasingly being used for a variety applications such as communications and communications between electrical devices. These networks make use of receivers that receive optical signals and use these optical signals to generate an electrical output. It is generally desirable to reduce the size of these receivers. However, optical systems use optical signals having differing strengths. It is desirable for a receiver to be usable with a variety of optical systems. As a result, there is a need for a compact receiver that can be employed with a variety of different signal strengths.

SUMMARY

A receiver includes a waveguide defined in a layer of silicon positioned on a base. The waveguide is immobilized relative to the base along the length of the waveguide. The waveguide is unbranched and is a multi-mode waveguide. The receiver also includes a groove configured to receive an optical fiber. The groove is positioned such that when the optical fiber is positioned in the groove, the waveguide receives a light signal that exits a facet of the optical fiber. The receiver also includes a light sensor configured to receive the light signal from the waveguide after the light signal is received by the waveguide, is guided through the waveguide, and exits the waveguide. The receiver also includes a tunable optical attenuator configured to attenuate the light signal as the light signal travels along the waveguide. The receiver can be formed on a chip such that the waveguide is the only optical waveguide on the chip.

The waveguide can include at least two curves arranged such that a single line can be drawn across more than three different sections of the waveguide. In some instances, the waveguide includes at least two curves that each bend for at least 170° or at least 180°. In some instances, the each of the curves has a radius of curvature less than 600 μm and the receiver is on a chip having a size less than 20 mm².

The attenuator can be positioned along more than 90% of an un-tapered portion of the waveguide. In some instances, the waveguide includes two tapers and the attenuator is positioned between the tapers and is positioned along more than 90% of an un-tapered portion of the waveguide.

BRIEF DESCRIPTION OF THE FIGURES

FIG. 1A is a topview of the receiver.

FIG. 1B is a cross-section of the receiver shown in FIG. 1A taken along the line labeled B in FIG. 1A.

DESCRIPTION

The receiver includes a waveguide configured to carry a light signal from an optical fiber to a light sensor such as a photodiode. An attenuator is configured to attenuate the light signal as the light signal travels along the waveguide. The attenuator can permit the receiver to be used with optical systems having different signal strengths. For instance, attenuating high intensity optical signals to an intensity that is appropriate for the light sensor allows the receiver to be used with an optical system that employs high intensity light signals.

The waveguide can include two curves that bend over 170° or 180°. These bends can permit the waveguide to have an S-shape. As a result, a line can extend through three different sections of the waveguide. These bends allow the receiver to be on a chip that is less than 20 mm². In order to achieve these small chip sizes, the bends typically have a radius of curvature of less than 600 μm. Waveguide curves with a radius of curvature at this level are generally associated with high degrees of optical loss. The inventors have found that controlling the waveguide dimensions can greatly reduce the level of optical loss. For instance, the dimensions of the waveguide can be selected such that the waveguide is a multi-mode waveguide. At these curvature levels, multi-mode waveguides are associated with reduced optical loss when compared with single mode waveguides at these levels of curvature. The use of a multi-mode waveguide is possible in this application because the waveguide terminates at the light sensor. As a result, the presence of multiple modes in the light signal as the light signal exits the waveguide does not adversely affect the output of the light sensor. Since the above features are true even if the optical fiber is a single mode fiber, the receiver is suitable for use with either single mode fibers or multi-mode fibers.

In addition to being a multimode waveguide, the waveguide dimensions are selected to further reduce optical loss. For instance, the inventors have found that optical loss in the fundamental mode is not strongly dependent on certain waveguide dimensions but that optical loss in the higher order mode is dependent on these dimensions. As a result, the waveguide dimensions can be selected to reduce the optical loss in the higher order modes. Since the optical loss in the fundamental mode is substantially stable over the range of suitable waveguide dimensions, the reduction of optical loss in the higher order modes reduces the overall optical loss associated with the bends in the waveguide. Accordingly, these dimensions make it possible for the receiver to be positioned on a chip with an area less than 20 mm².

Figure 1A:
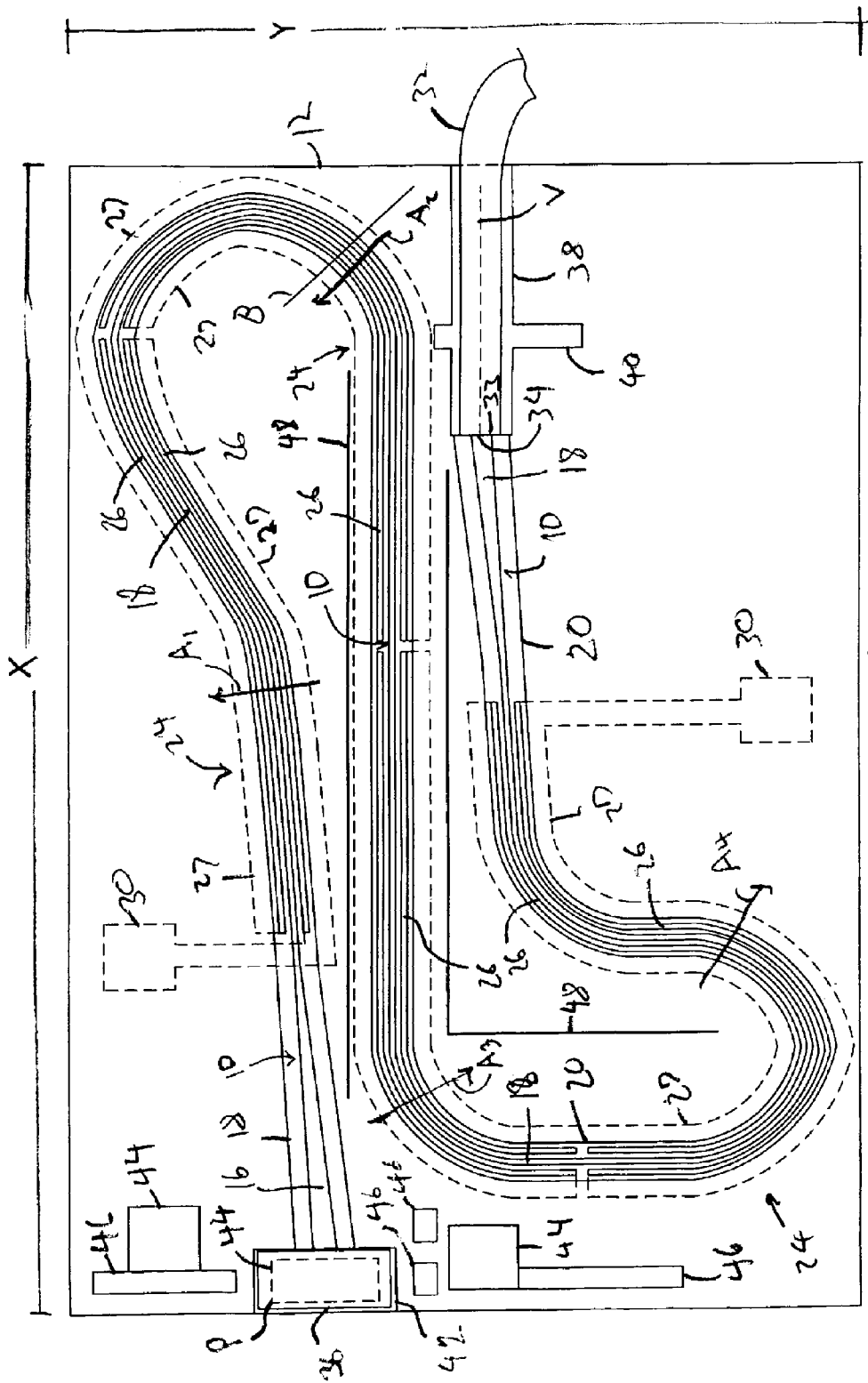
FIG. 1A through FIG. 1B illustrate a receiver.
Figure 1B:
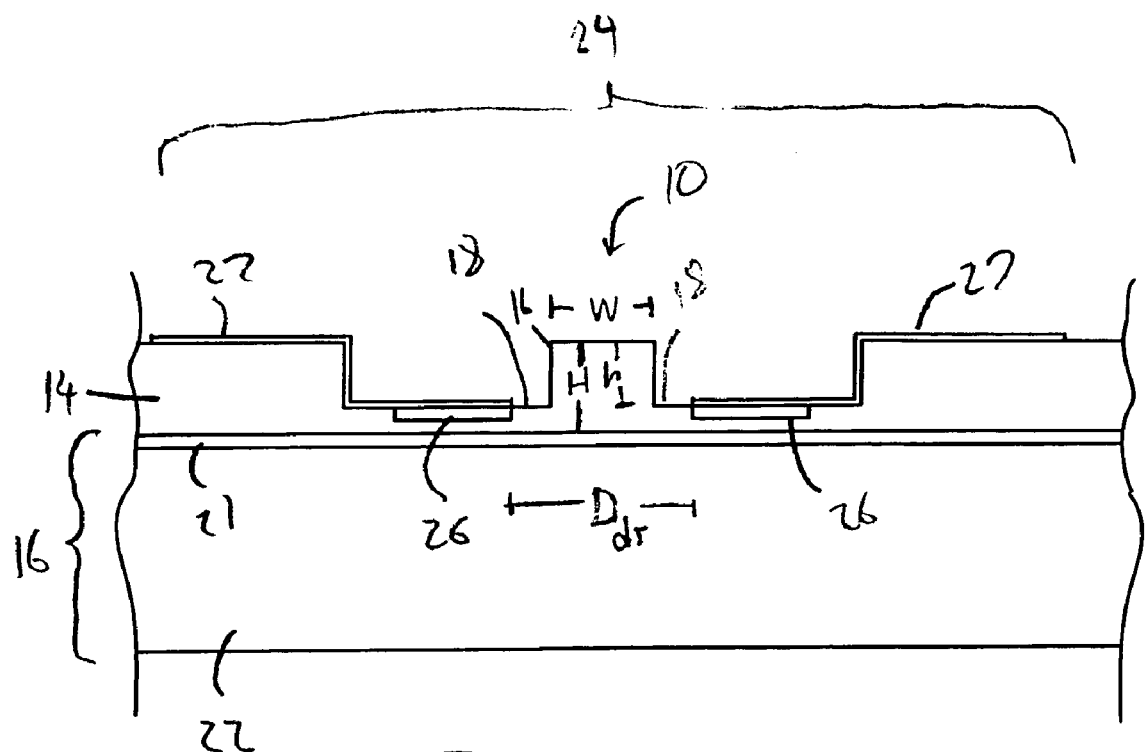

FIG. 1A through FIG. 1B illustrate a receiver. FIG. 1A is a topview of the receiver. FIG. 1B is a cross-section of the receiver shown in FIG. 1A taken along the line labeled B in FIG. 1A.

The receiver includes a waveguide 10 formed on a chip 12 such as an optical chip or an electro-optical chip. The chip 12 has a first light-transmitting medium 14 positioned on a base 16. The first light-transmitting medium 14 includes a ridge 18 defined by trenches 20 that extend into the first light-transmitting medium 14 on opposing sides of the ridge. The ridge defines an upper portion of the waveguide 10. Suitable first light-transmitting media include, but are not limited to, silicon, polymers, silica, SIN, GaAs, InP and LiNbO₃. The portion of the base 16 adjacent to the first light-transmitting medium 14 is configured to reflect light signals from the waveguide 10 back into the waveguide 10 in order to constrain light signals in the waveguide 10. For instance, the portion of the base 16 adjacent to the first light-transmitting medium 14 can be an optical insulator 21 with a lower index of refraction than the first light-transmitting medium 14. The drop in the index of refraction can cause reflection of a light signal from the first light-transmitting medium 14 back into the first light-transmitting medium 14. The base 16 can include the optical insulator 21 positioned on a substrate 22.

In one example, the chip 12 is constructed on a silicon-on-insulator wafer. A silicon-on-insulator wafer includes a silicon layer that serves as the first light-transmitting medium 14. The silicon-on-insulator wafer also includes a layer of silica positioned on a silicon substrate. The layer of silica can serve as the optical insulator 21 and the silicon substrate can serve as the substrate 22.

The receiver includes an optical attenuator 24. The attenuator 24 includes doped regions 26 formed in the first light-transmitting medium 14 on opposing sides of the ridge. The doped regions 26 can be N-type material or P-type material. When one doped region 26 is an N-type material, the doped region 26 on the opposing side of the ridge is a P-type material. Electrical energy can be applied to the doped regions 26 to inject free carriers into the first light-transmitting medium 14 between the doped regions 26. Free carrier absorption provides the optical attenuation. The degree of attenuation can be tuned by tuning the electrical energy applied between the doped regions 26.

The attenuator 24 also includes electrical contacts 27 on opposing sides of the ridge as is evident in FIG. 1B. In FIG. 1A, the electrical contacts 27 are illustrated by dashed lines so they can be distinguished from other features in FIG. 1A. Each of the electrical contacts 27 is in electrical communication with one or more of the doped regions 26. As a result, electrical energy can be applied across the electrical contacts 27 in order to apply electrical energy across the doped regions 26. As a result, the electrical energy applied across the electrical contacts 27 can be tuned in order to achieve the desired degree of attenuation.

The electrical contacts 27 can be positioned in the trenches 20. In some instances, as shown in FIG. 1B, one or more of the electrical contacts 27 extends from within the trenches 20, up the side of the trenches 20 and out of the trenches 20 onto a free space region (or slab region) of the first light-transmitting medium 14.

The attenuator 24 can optionally include a plurality of sub-attenuators. For instance, the attenuator 24 illustrated in FIG. 1A includes four sub-attenuators arranged along the waveguide 10. The electrical contacts 27 provide electrical communication between adjacent sub-attenuators. For instance, each of the electrical contacts 27 provides electrical communication between the n-type doped regions 26 of one sub-attenuator and the p-type doped regions 26 of a different sub-attenuator. As a result, the electrical contacts 27 connect the sub-attenuators in series. The series connections cause electrical energy applied across the attenuator 24 to flow across the waveguide 10 multiple times. For instance, electrical energy that travels through a sub-attenuator in the direction of the arrow labeled $A_1$ in FIG. 1A, travels across the next sub-attenuator in the direction of the arrow labeled $A_2$, across the next sub-attenuator in the direction of the arrow labeled $A_3$, and across the next sub-attenuator in the direction of the arrow labeled $A_4$.

The electrical contacts 27 are in electrical communication with contact pads 30. The contacts pads can be employed to apply the electrical energy to the electrical contacts 27. The electrical contacts 27, the contact pads 30, and the conductors that provide electrical communication between the electrical contacts 27 and the contact pads 30 can be conductors such as metals. Suitable materials for the electrical contacts 27, contact pads 30, and conductors include, but are not limited to, Al or Au. In some instances, there are one or more additional layers of material between the first light-transmitting medium 14 and the electrical contacts 27, contact pads 30, and/or conductors. The one or more layers of material can provide electrical insulation between the chip and the electrical contacts 27, contact pads 30, and/or conductors. For instance, when the first light-transmitting medium 14 is silicon, there can be a layer of silica between the first light-transmitting medium 14 and the electrical contacts 27, contact pads 30, and/or conductors. However, the one or more layers of material need not be between the contact pads 30 and the doped regions 26 to increase conduction between the contact pads 30 and the doped regions 26.

The waveguide 10 can be configured to receive light signals from an optical fiber 32. For instance, the facet 33 of an optical fiber 32 can be aligned with a facet 34 of the waveguide 10 such that light signals traveling along the optical fiber 32 exit the optical fiber 32 through the facet 33 of the optical fiber 32 and then enter the waveguide 10 through the facet 34 of the waveguide 10. The waveguide 10 carries the light signals to the optical attenuator 24.

The waveguide 10 can have cross-sectional dimensions that are substantially smaller than the cross-sectional dimensions of the optical fiber 32. For instance, the core of optical fibers 32 typically have a diameter of about 9 μm. As a result, the portion of the waveguide 10 that carries the light signal to the attenuator 24 can taper. The taper can reduce the cross-sectional size of the waveguide 10 such that the cross-sectional size of the waveguide 10 becomes smaller as the light signal approaches the attenuator 24. The taper can be a one dimensional taper but is preferably a two-dimensional taper in order to achieve the dimensions needed for the waveguide 10 to have the desired curvature. As is evident from FIG. 1A, the taper can optionally be in a straight region of the waveguide 10. The location of the taper in a straight region of the waveguide 10 can reduce optical loss. Because of the multimode nature of the waveguide 10, the taper does not need to be fully adiabatic (i.e. a portion of the coupled light may be converted to higher order modes) and can accordingly taper more quickly. As a result, the taper can be substantially shorter than a fully adiabatic taper. For instance, the taper can be have a length less than 2.5 mm or less than 2 mm. The ability to increase the taper rate can be important in reducing chip size. For instance, smaller waveguides provide increase attenuation efficiency but taper length generally must be increased in order to properly couple the light signals from the taper into a smaller waveguide. However, the increased taper rate that is available here permits for waveguide dimensions associated with efficient attenuation without undesirably long tapers.

The waveguide 10 also carries the light signal to a light sensor 36. The receiver employs the light signal received at the light sensor 36 to generate an electrical signal. For instance, the light sensor 36 can be configured to convert the light signal into an electrical signal. Suitable light sensors 36 include, but are not limited to, photodetectors, photodiodes, avalanche photodiodes, charge coupled devices (CCDs), and photomultiplier tubes.

The portion of the waveguide 10 that carries the light signal from the attenuator 24 to the light sensor 36 can taper. The taper can increase the cross-sectional size of the waveguide 10 such that the cross-sectional size of the waveguide 10 increases as the light signal approaches the light sensor 36. The taper enlarges the mode of the light signal and accordingly reduces divergence-based 16 loss that can occur as the light signal travels from the waveguide 10 to the light sensor 36. The taper can be a one-dimensional taper but is preferably a two-dimensional taper. As is evident from FIG. 1A, the taper can optionally be in a straight region of the waveguide 10. The location of the taper in a straight region of the waveguide 10 can reduce optical loss. Because of the multimode nature of the waveguide 10, the taper does not need to be fully adiabatic. As a result, the taper can be substantially shorter than a fully adiabatic taper. For instance, the taper can be have a length less than 2.5 mm or less than 2 mm. The ability to increase the taper rate can be important in reducing chip size. For instance, smaller waveguides provide increase attenuation efficiency but taper length generally must be increased in order to properly couple the light signals from a smaller waveguide. However, the increased taper rate that is available here permits for waveguide dimensions associated with efficient attenuation without undesirably long tapers.

FIG. 1A illustrates the attenuator positioned between the tapers on the waveguide, however, the attenuator can additionally or alternately be positioned on at least a portion of one of the tapers or both of the tapers. For instance, the tapered region of the waveguide can be positioned between the electrical contacts and doped regions associated with the attenuator. Placing the attenuator on the un-tapered portion of the waveguide and on one or more tapered portions of the waveguide can enhance the attenuation efficiency. In some instances, the attenuator includes sub attenuators and at least one of the sub-attenuators is positioned on one of the tapers and extends onto the un-tapered portion of the waveguide. Alternately, the attenuator includes sub attenuators and at least one of the sub-attenuators is positioned on one each of the tapers and at least one of the sub-attenuators extends from each of the taper onto the un-tapered portion of the waveguide. In some instances, the attenuator includes sub attenuators and at least one of the sub-attenuators is positioned on one of the tapers and does not extend onto the un-tapered portion of the waveguide. Alternately, the attenuator includes sub attenuators and at least one of the sub-attenuators is positioned on one each of the tapers and none of the sub-attenuators extends from a taper onto the un-tapered portion of the waveguide. Embodiments where a sub-attenuator does not extend onto the un-tapered portion of the waveguide can increase the portion of the electrical current flowing through the taper and can accordingly increase the portion of attenuation that occurs in the taper.

The optical fiber 32 can be coupled with the receiver. For instance, a groove 38 can extend into the chip 12 and the end of the optical fiber 32 can be immobilized in the groove 38. For instance, the end of the optical fiber 32 can be epoxied into the groove 38. The groove 38 illustrated in FIG. 1A is a V-groove. The dashed line labeled V in FIG. 1A shows the bottom of the V-groove. The v-groove can extend only into the first light-transmitting medium 14 or can extend through the first light-transmitting medium 14 and into the base 16. As will be described in more detail below, the optical fiber 32 can be a single mode fiber 32 or a multi-mode fiber 32.

A trench 40 can extend across the groove 38 for the optical fiber 32. The trench 40 can extend only into the first light-transmitting medium 14 or can extend through the first light-transmitting medium 14 and into the base 16. The trench 40 can serve as an overflow trench to divert liquids such as epoxies away from the facet 33 of the optical fiber 32 and/or the facet 34 of the waveguide 10. For instance, when the optical fiber 32 is to be epoxied into the groove 38, the liquid form of the epoxy is poured into the groove 38 and/or onto the fiber 32 at a location between the edge of the chip 12 and the trench 40. The liquid will flow into the trench 40 before reaching the facet 33 of the optical fiber 32 and/or the facet 34 of the waveguide 10.

One or more materials can optionally be positioned between the facet 34 of the waveguide 10 and the facet 33 of the optical fiber 32. Examples of suitable materials for positioning between the facet 34 of the waveguide 10 and the facet 33 of the optical fiber 32 include, but are not limited to, index matching materials, such as silica gel.

The light sensor 36 can be positioned in a recess 42. Depending on the dimensions of the light sensor 36, the recess 42 can extend into only the first light-transmitting medium 14 or can extend through the first light-transmitting medium 14 and into the base 16. One or more materials can optionally be positioned between a facet of the waveguide 10 and the light sensor 36. Examples of suitable materials for positioning between the facet of the waveguide 10 and the light sensor 36 include, but are not limited to, index matching materials, such as silica gel.

The chip 12 can include one or more pads 44 for mounting components on the chip 12. For instance, a pad 44 for mounting the light sensor 36 can be positioned in the bottom of the recess 42. The dashed lines labeled P in FIG. 1A can illustrate the location of the pad 44 on the bottom of the recess 42 and beneath the light sensor 36. Other examples of components that can be mounted on the pads 44 include, but are not limited to, amplifiers such as impedance matching amplifiers, capacitors, and resistors. Suitable pads 44 include, but are not limited to, solder pads.

The chip 12 can also include one or more communication pads 46 that can be employed to provide electrical communication with one or more components on the chip 12. For instance, the one or more components can be wire-bonded to the communication pads 46 and components that are external to the chip 12 can also be bonded to the communication pads 46 in order to provide communication between the external components and the components on the chip 12. Suitable communication pads 46 include, but are not limited to, gold pads 46. In some instances where one or more communication pads 46 are positioned on the first light-transmitting medium 14, there are one or more additional layers of material between the first light-transmitting medium 14 and the communication pads 46. For instance, when the first light-transmitting medium 14 is silicon, there can be a layer of silica between the first light-transmitting medium 14 and the communication pads 46.

The chip 12 can include one or more isolation trenches 48 extending into the first light-transmitting medium 14. The isolation trenches 48 can help provide optical and/or electrical isolation between regions of the chip 12 on opposing sides of the isolation trench 48. For instance, FIG. 1A shows isolation trenches 48 between different regions of the waveguide 10. The illustrated isolation trenches 48 can help to provide optical isolation of the different waveguide 10 regions. The illustrated isolation trenches 48 can also help to provide electrical isolation of the attenuators 24 on the different waveguide 10 regions. Suitable isolation trenches 48 can extend only into or through the first light-transmitting medium 14 or can extend through the first light-transmitting medium 14 and into the base 16. The role of the isolation trenches on the receiver is enhanced due to the decreased chip size.

The waveguide 10 includes two curves that bend over 170° or 180°. These bends can permit the waveguide 10 to have a S-shape as evident in FIG. 1A. For instance, a line can extend through three different sections of the waveguide 10. Since the attenuator 24 structure disclosed above remains effective on curves parts of the waveguide 10, the attenuator 24 can be arranged along the curve. For instance, FIG. 1A illustrates the sub-attenuators positioned along the curves.

The bends in the waveguide 10 allow the receiver to be on a chip 12 that is less than 30 mm$^2$, 20 mm$^2$, or 15 mm$^2$ where the area of a chip 12 such as the chip 12 shown in FIG. 1A is determined by (X*Y) where X and Y are each labeled in FIG. 1A. In order to achieve these small chip 12 sizes, the bends typically have a radius of curvature of less than 1000 µm, 600

μm, or 400 μm. Curves having this level of tightness are generally associated with high degrees of optical loss. The inventors have found that controlling the waveguide 10 dimensions can greatly reduce the level of optical loss. The ridge of the waveguide 10 has a height labeled h relative to the trench 20 and a height labeled H relative to the base 16. Additionally, the width of the waveguide 10 has a width labeled W. The height h, height H, and width W are selected such that the waveguide 10 is a multi-mode waveguide 10. At these curvature levels, multi-mode waveguides 10 are associated with reduced optical loss when compared with single mode waveguides at these levels of curvature. FIG. 1B shows the dimensions of the waveguide 10. The use of a multi-mode waveguide 10 is possible in this application because the waveguide 10 terminates at a light sensor 36 such as a photodiode. As a result, the presence of multiple modes in the light signal as the light signal exits the waveguide 10 does not adversely affect the output of the light sensor 36. Additionally, since the waveguide 10 can optionally be un-branched and/or the only optical waveguide 10 on the chip 12, it is possible that there will not be other processing of the light signal traveling along the waveguide 10. Accordingly, the presence of multiple modes in the light signal as the light signal exits the waveguide 10 does not adversely affect the performance of the receiver. Since the above features are true even if the optical fiber 32 is a single mode fiber 32, the receiver is suitable for use with either single mode fibers 32 or multi-mode fibers 32.

In addition to being a multimode waveguide 10, the height h, height H, and width W is selected to further reduce optical loss. For instance, the inventors have found that optical loss in the fundamental mode is not strongly dependent on these dimensions but that optical loss in the higher order mode is dependent on these dimensions. In particular, the level of optical loss in the higher order mode is dependent on the distance of the bottom of the trench 20 from that base 16 (H-h) but not strongly dependent on H by itself. In particular, the level of optical loss can be reduced by decreasing the distance of the bottom of the trench 20 from the base 16 (H-h). However, as (H-h) decreases, the attenuator 24 becomes less efficient. As a result, when the distance of the bottom of the trench 20 from that base 16 (H-h) is decreased, the length of the attenuator 24 needs to be increased to achieve the desired level of attenuation. In order to achieve a level of attenuation that allows the receiver to be effectively employed with different optical systems while retaining the desired dimensions, the waveguide 10 preferably has an H greater than 1, 2, or 3 and/or less than 4, 5, or 6; while h is greater than 0.5, 1, or, 1.5 and/or less than 3, 4, or 5; and while W is greater than 1, 2, or, 3 and/or less than 4, 5, or 6. Under these conditions, the ratio of H:h can be greater than 1, and/or less than 2.

The optical loss can also be reduced by controlling the distance between the doped regions 26 in the attenuator 24. In FIG. 1A, the doped regions 26 on the opposing sides of the ridge are separated by a distance labeled $D_{dr}$. Increasing the separation $D_{dr}$ can reduce optical loss but this occurs at the cost of reduced attenuation efficiency. As a result, increasing the separation $D_{dr}$ can reduce optical loss but can result in a larger chip size. In combination with the above waveguide 10 dimensions, a suitable $D_{dr}$ for achieving the above chip 12 sizes includes, but is not limited to, $D_{dr}$ greater than 7, 8, or 9 and/or less than 11, 12, or 13.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
   a waveguide defined in a layer of silicon positioned on a base, the waveguide being immobilized relative to the base along the length of the waveguide,
   the waveguide being unbranched, and
   the waveguide being a multi-mode waveguide;
   a groove configured to receive an optical fiber, the groove positioned such that when the optical fiber is positioned in the groove the waveguide receives a light signal that exits a facet of the optical fiber;
   a light sensor configured to receive the light signal from the waveguide after the light signal is received by the waveguide, is guided through the waveguide, and exits the waveguide,
   the light sensor configured to convert the light signal to an electrical signal;
   a tunable optical attenuator configured to attenuate the light signal as the light signal travels along the waveguide; and
   wherein the base includes an optical insulator on a substrate, the optical insulator including silica and the substrate including silicon.

2. The device of claim 1, wherein the waveguide includes two curves that each bend for at least 170°.

3. The device of claim 1, wherein each of the curves has a radius of curvature less than 600 μm.

4. The device of claim 1, wherein the waveguide includes more than one curve and is arranged such that a single line can be drawn across more than three different sections of the waveguide.

5. The device of claim 1, wherein the waveguide includes a ridge extending upward from a silicon slab, the ridge having a height h relative to a top surface of the silicon and a height H relative to the base, the height H is greater than 1 and less than 6, while the height h is greater than 0.5 and less than 5, a ratio of H:h is greater than 1 and less than 2.

6. The device of claim 1, wherein the waveguide includes two tapers and the attenuator is positioned between the tapers.

7. The device of claim 6, wherein the attenuator is positioned along more than 90% of an untapered portion of the waveguide.

8. The device of claim 1, wherein the attenuator is positioned along more than 90% of an untapered portion of the waveguide.

9. The device of claim 1, wherein the attenuator includes a plurality of sub-attenuators that are electrically connected in series.

10. An optical device, comprising:
    a waveguide defined in a layer of silicon positioned on a base, the waveguide being immobilized relative to the base along the length of the waveguide,
    the waveguide being unbranched, and
    the waveguide being a multi-mode waveguide;
    the waveguide including two curves that each bend for at least 170° and each has a radius of curvature less than 600 μm;
    the curves being arranged such that a single line can be drawn across more than three different sections of the waveguide;
    a groove configured to receive an optical fiber, the groove positioned such that when the optical fiber is positioned in the groove the waveguide receives a light signal that exits a facet of the optical fiber;

a light sensor configured to receive the light signal from the waveguide after the light signal is received by the waveguide, is guided through the waveguide, and exits the waveguide;

the waveguide including a taper between an untapered portion of the waveguide and the light sensor and between the untapered portion of the waveguide and the groove; and a tunable optical attenuator configured to attenuate the light signal as the light signal travels along the waveguide, the attenuator extending along more than 90% of the untapered portion of the waveguide.

11. An optical device, comprising:

A waveguide defined in a layer of silicon positioned on a base, the waveguide being immobilized relative to the base along the length of the waveguide,
the waveguide being unbranched, and
the waveguide being a multi-mode waveguide;

a groove configured to receive an optical fiber, the groove positioned such that when the optical fiber is positioned in the groove the waveguide receives a light signal that exits a facet of the optical fiber;

a light sensor configured to receive the light signal from the waveguide after the light signal is received by the waveguide, is guided through the waveguide, and exits the waveguide,
the light sensor configured to convert the light signal to an electrical signal;

a tunable optical attenuator configured to attenuate the light signal as the light signal travels along the waveguide; and wherein the waveguide includes two curves that each bend for at least 170°.

12. The device of claim 11, wherein each of the curves has a radius of curvature less than 600 μm.

13. The device of claim 11, wherein the waveguide includes more than one curve and is arranged such that a single line can be drawn across more than three different sections of the waveguide.

14. The device of claim 11, wherein the waveguide includes a ridge extending upward from a silicon slab, the ridge having a height h relative to a top surface of the silicon and a height H relative to the base, the height H is greater than 1 and less than 6, while the height h is greater than 0.5 and less than 5, a ratio of H:h is greater than 1 and less than 2.

15. The device of claim 11, wherein the waveguide includes two tapers and the attenuator is positioned between the tapers.

16. The device of claim 15, wherein the attenuator is positioned along more than 90% of an untapered portion of the waveguide.

17. The device of claim 11, wherein the attenuator is positioned along more than 90% of an untapered portion of the waveguide.

18. The device of claim 11, wherein the attenuator includes a plurality of sub-attenuators that are electrically connected in series.

19. An optical device, comprising:

A waveguide defined in a layer of silicon positioned on a base, the waveguide being immobilized relative to the base along the length of the waveguide,
the waveguide being unbranched, and
the waveguide being a multi-mode waveguide;

a groove configured to receive an optical fiber, the groove positioned such that when the optical fiber is positioned in the groove the waveguide receives a light signal that exits a facet of the optical fiber;

a light sensor configured to receive the light signal from the waveguide after the light signal is received by the waveguide, is guided through the waveguide, and exits the waveguide,
the light sensor configured to convert the light signal to an electrical signal;

a tunable optical attenuator configured to attenuate the light signal as the light signal travels along the waveguide; and wherein each of the curves has a radius of curvature less than 600 μm.

20. The device of claim 19, wherein the waveguide includes more than one curve and is arranged such that a single line can be drawn across more than three different sections of the waveguide.

21. The device of claim 19, wherein the waveguide includes a ridge extending upward from a silicon slab, the ridge having a height h relative to a top surface of the silicon and a height H relative to the base, the height H is greater than 1 and less than 6, while the height h is greater than 0.5 and less than 5, a ratio of H:h is greater than 1 and less than 2.

22. The device of claim 19, wherein the waveguide includes two tapers and the attenuator is positioned between the tapers.

23. The device of claim 22, wherein the attenuator is positioned along more than 90% of an untapered portion of the waveguide.

24. The device of claim 19, wherein the attenuator is positioned along more than 90% of an untapered portion of the waveguide.

25. The device of claim 19, wherein the attenuator includes a plurality of sub-attenuators that are electrically connected in series.

26. An optical device, comprising:

A waveguide defined in a layer of silicon positioned on a base, the waveguide being immobilized relative to the base along the length of the waveguide,
the waveguide being unbranched, and
the waveguide being a multi-mode waveguide;

a groove configured to receive an optical fiber, the groove positioned such that when the optical fiber is positioned in the groove the waveguide receives a light signal that exits a facet of the optical fiber;

a light sensor configured to receive the light signal from the waveguide after the light signal is received by the waveguide, is guided through the waveguide, and exits the waveguide,
the light sensor configured to convert the light signal to an electrical signal;

a tunable optical attenuator configured to attenuate the light signal as the light signal travels along the waveguide; and wherein the waveguide includes more than one curve and is arranged such that a single line can be drawn across more than three different sections of the waveguide.

27. The device of claim 26, wherein the waveguide includes a ridge extending upward from a silicon slab, the ridge having a height h relative to a top surface of the silicon and a height H relative to the base, the height H is greater than 1 and less than 6, while the height h is greater than 0.5 and less than 5, a ratio of H:h is greater than 1 and less than 2.

28. The device of claim 26, wherein the waveguide includes two tapers and the attenuator is positioned between the tapers.

29. The device of claim 28, wherein the attenuator is positioned along more than 90% of an untapered portion of the waveguide.

30. The device of claim 26, wherein the attenuator is positioned along more than 90% of an untapered portion of the waveguide.

31. The device of claim 26, wherein the attenuator includes a plurality of sub-attenuators that are electrically connected in series.

32. An optical device, comprising:
A waveguide defined in a layer of silicon positioned on a base, the waveguide being immobilized relative to the base along the length of the waveguide,
the waveguide being unbranched, and
the waveguide being a multi-mode waveguide;
a groove configured to receive an optical fiber, the groove positioned such that when the optical fiber is positioned in the groove the waveguide receives a light signal that exits a facet of the optical fiber;
a light sensor configured to receive the light signal from the waveguide after the light signal is received by the waveguide, is guided through the waveguide, and exits the waveguide,
the light sensor configured to convert the light signal to an electrical signal;
a tunable optical attenuator configured to attenuate the light signal as the light signal travels along the waveguide; and
wherein the waveguide includes a ridge extending upward from a silicon slab, the ridge having a height h relative to a top surface of the silicon and a height H relative to the base, the height H is greater than 1 and less than 6, while the height h is greater than 0.5 and less than 5, a ratio of H:h is greater than 1 and less than 2.

33. The device of claim 32, wherein the waveguide includes two tapers and the attenuator is positioned between the tapers.

34. The device of claim 33, wherein the attenuator is positioned along more than 90% of an untapered portion of the waveguide.

35. The device of claim 32, wherein the attenuator is positioned along more than 90% of an untapered portion of the waveguide.

36. The device of claim 32, wherein the attenuator includes a plurality of sub-attenuators that are electrically connected in series.

37. An optical device, comprising:
A waveguide defined in a layer of silicon positioned on a base, the waveguide being immobilized relative to the base along the length of the waveguide,
the waveguide being unbranched, and
the waveguide being a multi-mode waveguide;
a groove configured to receive an optical fiber, the groove positioned such that when the optical fiber is positioned in the groove the waveguide receives a light signal that exits a facet of the optical fiber;
a light sensor configured to receive the light signal from the waveguide after the light signal is received by the waveguide, is guided through the waveguide, and exits the waveguide,
the light sensor configured to convert the light signal to an electrical signal;
a tunable optical attenuator configured to attenuate the light signal as the light signal travels along the waveguide; and
wherein the waveguide includes two tapers and the attenuator is positioned between the tapers.

38. The device of claim 37, wherein the attenuator is positioned along more than 90% of an untapered portion of the waveguide.

39. The device of claim 37, wherein the attenuator includes a plurality of sub-attenuators that are electrically connected in series.

40. An optical device, comprising:
A waveguide defined in a layer of silicon positioned on a base, the waveguide being immobilized relative to the base along the length of the waveguide,
the waveguide being unbranched, and
the waveguide being a multi-mode waveguide;
a groove configured to receive an optical fiber, the groove positioned such that when the optical fiber is positioned in the groove the waveguide receives a light signal that exits a facet of the optical fiber;
a light sensor configured to receive the light signal from the waveguide after the light signal is received by the waveguide, is guided through the waveguide, and exits the waveguide,
the light sensor configured to convert the light signal to an electrical signal;
a tunable optical attenuator configured to attenuate the light signal as the light signal travels along the waveguide; and
wherein the attenuator is positioned along more than 90% of an untapered portion of the waveguide.

41. The device of claim 40, wherein the attenuator includes a plurality of sub-attenuators that are electrically connected in series.

* * * * *